Sept. 9, 1958
C. S. ALLEN
2,851,232
LANDING DECK FOR AIRCRAFT
Filed May 25, 1956
2 Sheets-Sheet 1
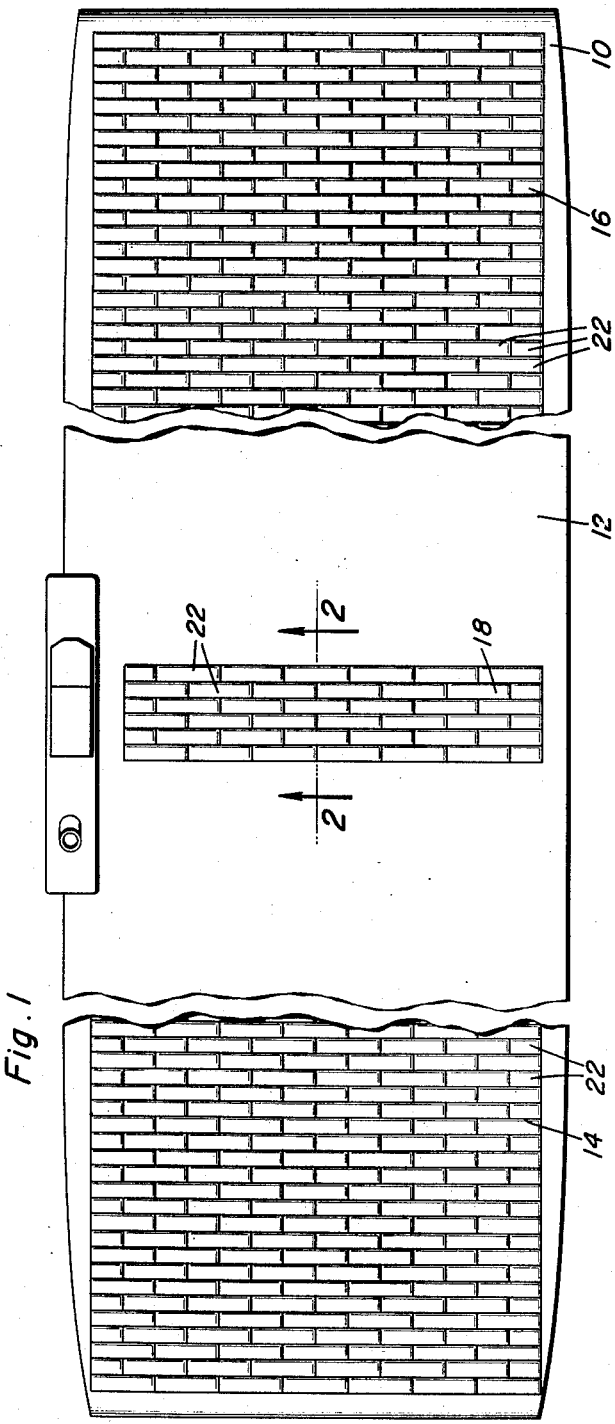
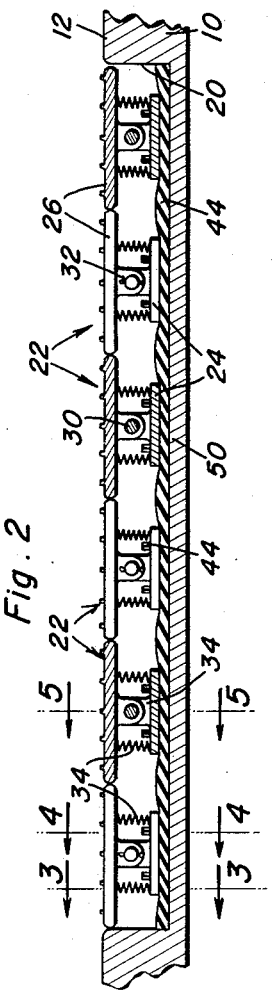
Charles S. Allen
INVENTOR.
BY
Attorneys

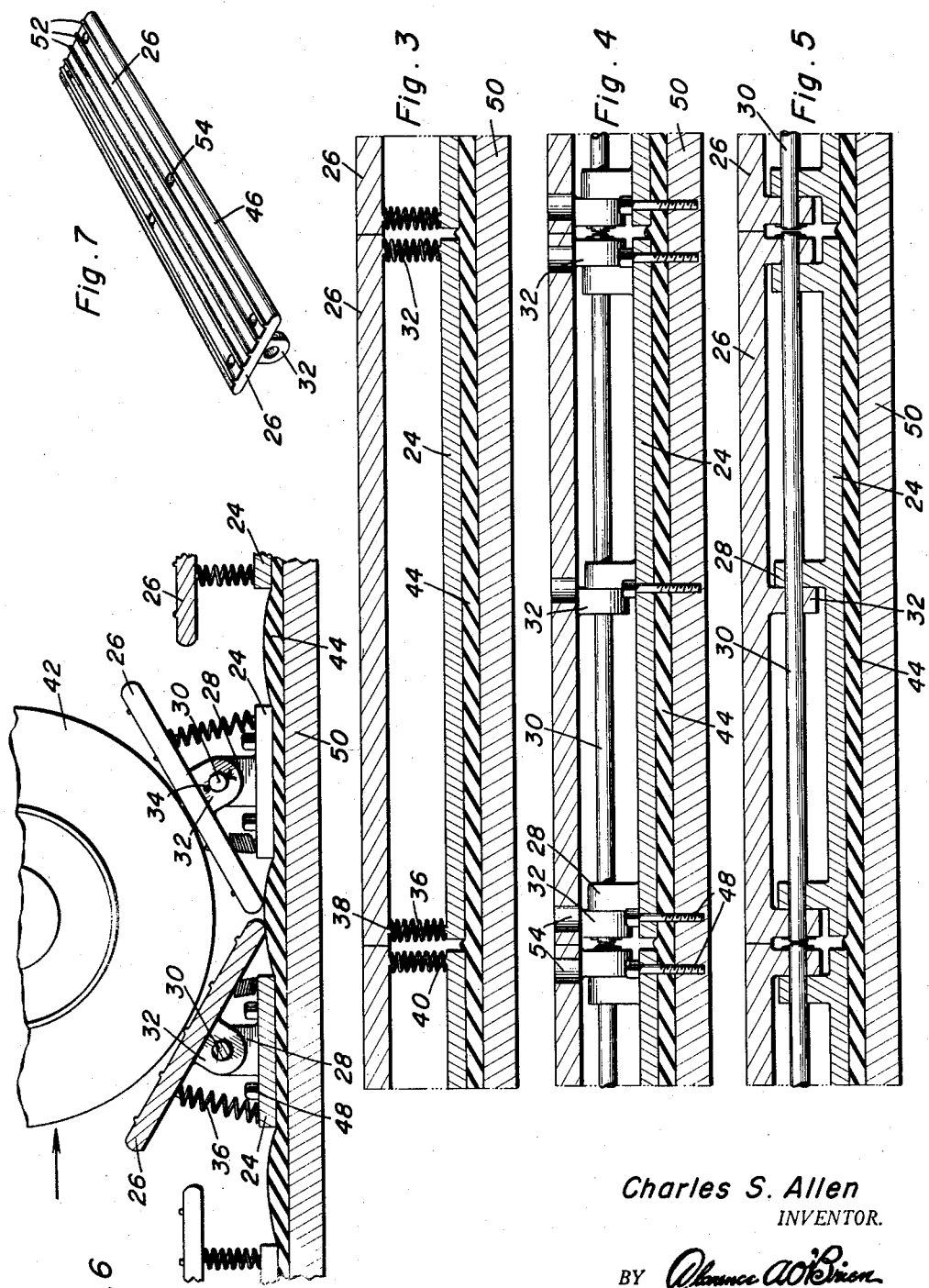

2,851,232

LANDING DECK FOR AIRCRAFT

Charles S. Allen, Bakersfield, Calif.

Application May 25, 1956, Serial No. 587,315

8 Claims. (Cl. 244—114)

This invention comprises a novel and useful landing deck for aircraft and more specifically relates to a novel unit component of an aircraft landing deck or strip affording a resilient and a speed retarding support for aircraft landing thereon.

The primary object of this invention is to provide a unitary device which may be readily assembled in side-by-side relation to form in their entirety an aircraft landing deck or strip of any desired dimensions.

A further object of the invention is to provide a unitary component of an aircraft landing deck which may be readily fabricated in convenient size for transportation and the like, and which shall provide a yieldably supported top surface adapted to receive the landing gear of aircraft thereon.

A further important object of the invention is to provide a unit component of a resilient aircraft landing deck which shall be equally adapted for use upon aircraft carriers, or for airfields.

Yet another important object of the invention is to provide an aircraft landing deck consisting of a plurality of resilient unit components, which shall cooperate with each other to provide relatively tilting surfaces under the weight of an aircraft, thereby cushioning the contact and weight of the aircraft and resiliently opposing motion of the aircraft to facilitate the landing of aircraft thereon.

An additional important object of the invention is to provide a unit component of an aircraft landing deck in accordance with the preceding objects wherein the inherent resiliency of each component unit may be augmented by mounting the same upon a resilient pad or base, and wherein the pad or base shall further resiliently cushion the tilting of the relatively inclinable landing surfaces of the devices.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view, parts being broken away, of an aircraft landing strip in accordance with this invention, the same being shown applied to an aircraft carrier;

Figure 2 is a vertical longitudinal sectional view taken substantially upon the plane indicated by the section line 2—2 of Figure 1, and upon an enlarged scale, and showing the manner in which the unit components of the landing strip are mounted in the deck of the aircraft carrier and are associated with each other;

Figures 3–5 are respective detail views taken upon an enlarged scale substantially upon the planes indicated by the section lines 3—3, 4—4 and 5—5 of Figure 2 and showing various structural details of the component units of this invention;

Figure 6 is a greatly enlarged detail view of one of the components shown in Figure 2, the operation of the tiltable members of the components under the weight of an aircraft during landing being shown therein; and Figure 7 is a perspective view of one of the tilting members forming the landing surface of the invention.

At the outset, it should be understood that the principles of this invention in providing a resilient landing strip or deck may be applied equally to airfields or the landing strips of aircraft carriers. In Figure 1 there is disclosed the application of the principles of this invention to an aircraft carrier, the same being indicated generally by the numeral 10, the aircraft carrier having a landing or flight deck 12 to which the present invention is applied. The resiliently cushioned landing surface constituted by the juxtaposition of a plurality of component units in accordance with this invention may be applied with the whole or any selected portion of the surface of the deck 12, and in one suitable manner of applying the invention there are provided zones or areas 14 and 16 at opposite ends of the aircraft deck, with one or more intermediate zones 18 disposed therebetween.

Referring now more specifically to the detailed view of Figure 2 it will be seen that in applying this invention to an aircraft carrier, the deck 12 is provided with a recess or depression 20 therein, which depression receives in side-by-side juxtaposed position a plurality of the component units, each indicated generally by the numeral 22.

Each of the component units which in their entirety make up the landing strip or deck in accordance with this invention includes a base 24 preferably in the form of a flat plate, together with a plate or member 26 having a top surface which constitutes a part of the surface of the landing strip. As will be apparent by comparing Figures 2 and 6 with Figures 3–5, it will be seen that the plates or members 26 may be of any desired length, but preferably each is considerably wider than the base plate 24 in order that its opposite side edges may overhang and overlie the edges of the base for a purpose to be subsequently set forth. In some instances, the members 26 may be of the same length as the base 24, although if desired a plurality of relatively shorter members 26 may be mounted upon a single base in end-to-end relation therealong.

Rising from the base 24 of each unit, upon the longitudinal medial portion thereof are a plurality of fulcrums or upstanding lugs 28 comprising journals and which carry a horizontally disposed hinge pin or pivot pin 30. Depending from the bottom side of the members 26, upon the longitudinal medial portions of the same are depending lugs 32 constituting bearing members and which are engaged and pivoted upon the pivot pin 30. In the interest of easy detachment of these members, the pivot or hinge pins 30 may be detachably secured in the registering apertures in the fulcrum members 28 and in the bearing members 32 by means of removable fasteners such as cotter pins or the like 34.

On opposite sides of the pivot pin 30, there are provided resilient members in the form of compression springs 36 which are operatively connected with the base 24 and the member 26, suitable projecting lugs 38 and 40 being provided to position and anchor these springs.

As so far described, it will now be apparent that the members 26 are free to tilt in either direction about the horizontal pivot pin 30, as will be apparent from an inspection of Figure 6. However such tilting movement is resisted resiliently by the springs 36, which tend to restore the plates 26 to their normally horizontal position, shown in Figure 2. As will now be understood, the weight of an aircraft wheel, or other landing gear, such as indicated at 42, after the same passes to one side on the pivot pin, will be effective to tilt the members 26 as shown in Figure 6.

As the aircraft moves across the landing strip to which this invention has been applied, it is evident that the wheel will at each pair of successive unit components of the landing deck encounter relatively inclined surfaces which will retard the speed of the aircraft as the wheel climbs up out of the same.

Accordingly, it will be evident that an aircraft landing upon this deck will be resiliently cushioned and also will have its progress resiliently opposed, thereby contributing to the quick stopping of the aircraft.

In order to further cushion the shock of landing an aircraft, it will be observed that there is preferably provided a resilient or cushioning mat or layer 44, as of sponge rubber or other suitable material, disposed in the bottom of the recess 20 and upon which the base plate 24 of each of the component units rests and is supported. As clearly apparent from Figure 6, adjacent base plates are spaced from each other, when the members 26 are in horizontal juxtaposed position as shown in Figure 2, and the space between the base plates provides further cushioning areas which are adapted to be engaged by the rounded edges 46 of each of the members 26 as the latter are tilted downwardly into such space as shown in Figure 6.

Suitable fasteners such as bolts, screws or the like 48 extend through the base plates 24, the cushioning layer 44 and into the supporting surface 50 constituting the bottom of the recess 20 or a suitable support member located therein.

Conveniently, the top surface of the members 26 is provided with ribs or ridges 52 to increase the traction of the top surface, and there are also provided suitable apertures 54 therethrough. These apertures constitute drainage means in some instances, but more important, provide access to the fastening members 48 whereby the unit component may be anchored or released from its secure engagement upon the supporting element 50.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An aircraft landing strip comprising a base, a plurality of members having each a flat top surface, said members being carried by and overlying said base in edge to edge juxtaposition to provide an aircraft landing surface, means disposed between said base and said members and journaling each of the latter intermediate its ends for tilting about a horizontal axis whereby said members will tilt under the weight of an aircraft and thereby provide with adjacent members relatively inclined surfaces resisting movement of an aircraft thereover.

2. The combination of claim 1 wherein said base has a recess therein, said members and journaling means being positioned in said recess.

3. The combination of claim 1 including a resilient pad underlying said members and resiliently cushioning the edges of the latter during said tilting.

4. The combination of claim 1 including springs operatively engaging said members and yieldingly resisting tilting of the latter about journaling means.

5. A landing strip for aircraft comprising a plurality of units adapted to be disposed in side-by-side relation, each unit including a base, a fulcrum mounted on each base and supporting a pivot pin, a member journaled intermediate its ends on each pivot pin for vertical tilting and having a flat top surface, the top surfaces of all of said members providing a landing surface for aircraft, resilient means operatively engaging each member and its base and yieldingly opposing tilting of the former.

6. The combination of claim 5 wherein each member has edges overlying and overhanging its pivot pin and base, and its resilient means being housed between its members and base.

7. The combination of claim 5 including a resilient pad disposed beneath said base for resiliently supporting said units.

8. A landing strip unit adapted to form with adjacent juxtaposed units a landing strip for aircraft and comprising; a base comprising a plate, a member having a surface on its top side forming a portion of an aircraft landing strip, depending medially disposed bearings on the underside of said member, journals upstanding upon said plate, a pivot pin engaged in said bearings and journals and mounting said members on the plate for tilting about said pivot pin, springs on opposite sides of the pivot pin operatively engaging the plate and member for yieldingly opposing tilting movement of the latter.

References Cited in the file of this patent

UNITED STATES PATENTS

| | | |
|---|---|---|
| 1,705,432 | Westcott | Mar. 12, 1929 |
| 1,709,069 | Fox | Apr. 16, 1929 |
| 1,914,573 | Kookogey | June 20, 1933 |
| 2,358,426 | Thompson | Sept. 19, 1944 |

OTHER REFERENCES

Scientific American, publication, October 2, 1920, page 339.